United States Patent [19]

Demrick et al.

[11] 4,282,629
[45] Aug. 11, 1981

[54] SOCKET FOR CASTER MOUNTING

[75] Inventors: Carl J. Demrick, Birmingham; Frederick C. Greene, St. Joseph, both of Mich.

[73] Assignee: Herder N.V., Antilles, Netherlands

[21] Appl. No.: 170,066

[22] Filed: Jul. 18, 1980

Related U.S. Application Data

[63] Continuation of Ser. No. 7,484, Jan. 29, 1979, abandoned.

[51] Int. Cl.³ .............................................. A47B 91/00
[52] U.S. Cl. ...................................................... 16/43
[58] Field of Search ...................... 16/38, 43, 31 R, 39

[56] References Cited

U.S. PATENT DOCUMENTS

| 506,813 | 10/1893 | Diss | 16/39 |
| 1,367,335 | 2/1921 | Walton et al. | 16/43 |
| 1,697,456 | 1/1929 | Carlson | 16/159 |

Primary Examiner—Doris L. Troutman
Attorney, Agent, or Firm—McWilliams, Mann and Zummer

[57] ABSTRACT

This invention relates to a socket for mounting casters and which preferably is of integral construction, made from a flat blank and formed to provide an upstanding tubular socket of opposed semi-circular sections, tapered adjacent their upper portion and partially overlapping at the top end of the tube, with spurs projecting outwardly thereof intermediate the height of the tube and having a bottom flange including upstanding teeth having wedge shaped top edges.

6 Claims, 7 Drawing Figures

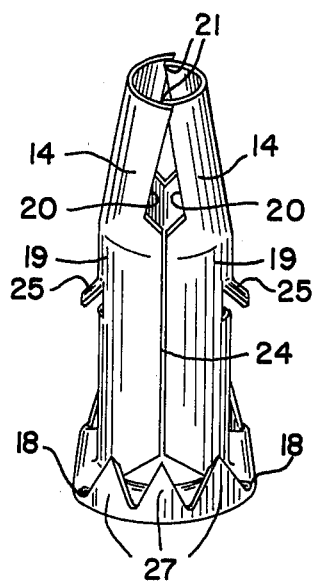
FIG-1.
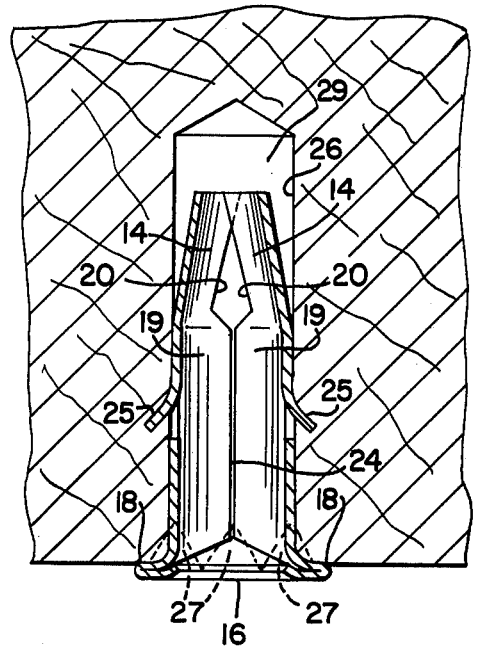
FIG-3.
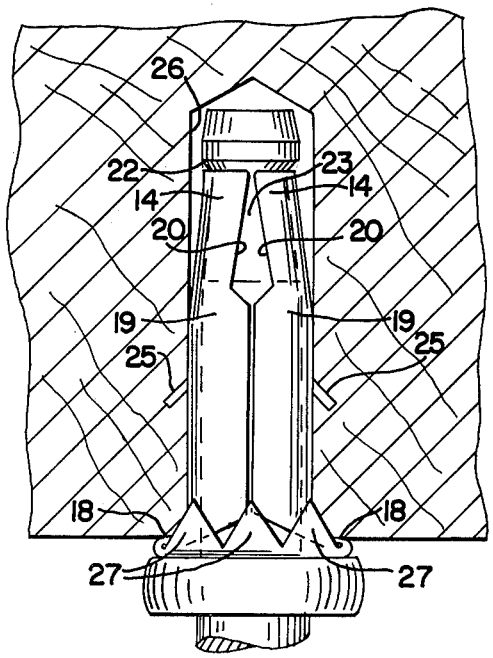
FIG-4.
FIG-2.

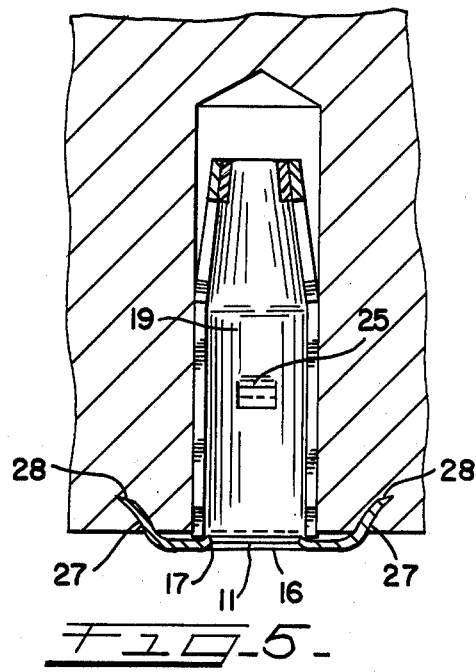
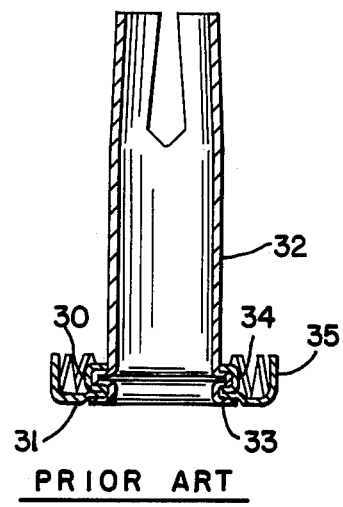
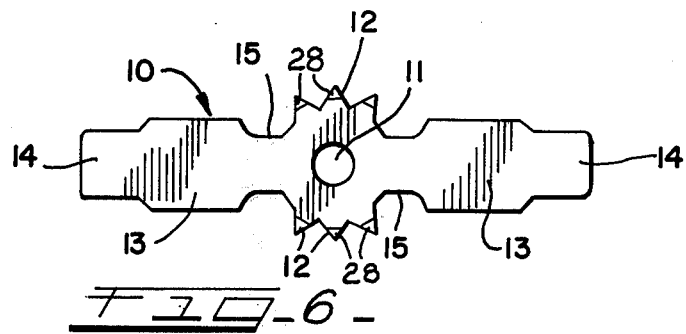

SOCKET FOR CASTER MOUNTING

This is a continuation of application Ser. No. 7,484, filed Jan. 29, 1979.

BACKGROUND OF THE INVENTION

Heretofore, great difficulties have been encountered in efforts directed toward obtaining a satisfactory socket for caster mountings and especially with respect to providing a socket that will afford adequate properties of retention when installed in an opening and finally positioned for receiving a caster stem. Prior sockets were made with a separate bottom flange member secured to a tubular socket with an annular collar extending around the socket at the juncture of the socket with the bottom flange, which formed part of the securement of the two pieces together. Upstanding teeth were provided around the bottom flange but were of a uniformly standard height such that, when the mounting socket was driven into an article of furniture to provide a receptacle for a caster stem, the annular collar acted as a stop and precluded the upstanding teeth from being driven into the furniture article to any substantial extent. Consequently, the socket failed to be retained in the mounting hole because, with the failure of the upstanding teeth to obtain sufficient purchase in the mounting hole to retain the socket therein, the only means of retention then became the frictional contact of the outer surface of the tubular socket with the walls of the mounting hole. This was inadequate because frequently the mounting was made of such diameter as to permit easy driving of the socket and to provide clearance for expansion thereof when a caster stem was driven into the socket. The prior socket assembly was difficult to drive into the mounting hole primarily because of the annular collar around the base plate at the juncture with the socket portion, so that it was impossible to hammer it into the mounting hole sufficiently to obtain proper retention and further, the tubular socket was made by rolling it into its tubular shape and an open seam was the result, so that upon driving the socket into the mounting hole it frequently occurred that the abutting edge of the seam became misaligned and then caused the caster stem for mounting therein, to be difficult to drive properly to receive a caster stem.

SUMMARY OF THE INVENTION

The integral socket structure of this invention avoids all of the difficulties encountered with prior caster sockets and provides an improved socket structure affording many advantages and greatly increased retention properties, which the previous sockets were incapable of providing. The present socket is made from a single flat blank and is converted by suitable forming operations into a one piece socket structure including a base, or track plate, having upstanding teeth of substantial length and sharpened to a wedge shaped edge at their upper end. An upstanding tube like socket is formed by two semi-cylindrical sections in edge-to-edge abutting relation and extending upwardly from the base plate, with the opposed edges of the sections in the upper tapering area of the socket, disposed in overlapping relation at their tips, which prevents misalignment of the tube sections in conforming to the prescribed diameter. These overlapped portions are opened up when a caster stem is entered into the socket and then engage under the shoulder of the top annular collar formed on the typical caster stem, thus retaining the stem in the socket. The fact that the tubular socket sections meet in edge-to-edge relation creates two diametrically opposite seams whereby the sections are equally disposed upon opposite sides of the axis and held in alignment by the overlapped upper tips, so that when a caster stem is inserted, the sections are symmetrically arranged in proper relationship and any opening movement is also symmetrical and equal.

The tubular socket sections are each provided witn an integral outstanding spur extending outwardly and sloping downwardly so that, while the socket may readily be driven into a mounting hole, it cannot as readily be withdrawn inasmuch as the spurs will engage into the walls of the mounting hole and greatly increase the resistance of the socket to being drawn out of the hole and thus increasing the retentive properties of the socket in its mounting. The formation of the upstanding teeth on the track plate also increases the retentive ability of the socket in the mounting hole by a considerable amount. These teeth are disclosed herein as being pointed, for being readily driven into the wood surrounding the mounting hole, but they are more importantly shaped to form a wedge like contour at the tip of each tooth and most importantly, this wedge shape is disposed on the inner side of the teeth so that when the socket structure is driven into a mounting hole with the teeth entering the wood around the hole, the teeth will be caused to assume flaring positions spreading outwardly into the wood and thus effectively increase the ability of the teeth to retain the socket in the mounting hole. This feature and the spurs on the socket sections, of course, can be used on socket arrangements of conventional design and greatly improve the retentive qualities thereof.

OBJECTS OF THE INVENTION

The primary purpose of this invention is to provide a caster mounting socket for insertion in a typical mounting hole and having greatly improved retentive properties to more securely position and hold the socket in the hole.

The principle object of the invention is the provision of a caster mounting socket formed completely from a single blank;

An important object of the invention is to provide a caster mounting socket including a base plate, or track plate, having upstanding teeth and an upwardly directed socket formed of semi-cylindrical sections having overlapping tips at the top of the socket;

Another object of the invention is the provision of a caster mounting socket having a base plate, or track plate, and an upwardly directed socket structure with one or more outwardly and downwardly sloping spurs projecting from the socket structure;

A further object of the invention is to provide a caster mounting socket structure including a base plate, or track plate, having upstanding teeth on such plate with wedge shaped top edges adapted to spread the teeth outwardly when driven into a wooden mounting structure;

A still further object of the invention is the provision of a caster mounting socket structure including a base plate, or track plate and an upwardly directed socket with upwardly directed pointed teeth on such plate having wedge shaped points and one or more downwardly and outwardly sloping spurs on the socket;

Still another object of the invention is to provide a caster mounting socket structure including a base plate, or track plate, and an upwardly directed socket formed of two semi-cylindrical sections tapering inwardly at the top with their tips in overlapping relation, downwardly and outwardly flaring spurs on an intermediate portion of each such section and upstanding teeth on the track plate having wedge shaped points;

A more specific object of the invention is the provision of a caster mounting socket structure including a base plate, or track plate and an upwardly extending socket with upstanding teeth on the track plate at opposite sides of the socket and parallel to the axis of the socket with outwardly and downwardly extending spurs on intermediate portions of the socket and located in areas at right angles to the areas occupied by the upstanding teeth and having wedge shaped surfaces on the inner faces of the teeth adjacent to their upper edges.

DESCRIPTION OF THE DRAWINGS

The foregoing and other and more specific objects of the invention are attained by the socket structure and arrangement illustrated in the accompanying drawings wherein FIG. 1 is a general perspective view of a caster mounting socket structure constructed in accordance with the teachings of this invention;

FIG. 2 is a top plan view of the socket structure;

FIG. 3 is a vertical sectional view through the socket structure taken on the line 3—3 of FIG. 2 showing the socket mounted in a mounting hole with the socket in elevation and the socket spurs embedded in the wood of the mounting structure;

FIG. 4 is a vertical sectional view similar to FIG. 3 but with a caster stem inserted into the socket with the socket in section;

FIG. 5 is a vertical sectional view of the socket structure taken at right angles to the section illustrated by FIG. 3, on the line 5—5 of FIG. 2, also showing the socket structure in a mounting hole and with the teeth flared into the wood of the mounting structure;

FIG. 6 is a plan view of a metal blank from which the caster socket is formed showing this member in the flat; and FIG. 7 is a vertical sectional view through a caster stem mounting socket showing a typical two piece construction.

DESCRIPTION OF PREFERRED EMBODIMENT

As best shown in FIG. 6, the caster socket of this invention starts out as a flat blank 10 shaped to include the bottom center hole 11 with the integral teeth 12 disposed therearound and oppositely extending strips 13 which ultimately comprise the semi-cylindrical sections of the tubular socket and the end portions 14 thereof which form the overlapping top portions of the socket. The respective strips 13 and end portions 14 are folded back upon the blank in the area of the narrow portion 15 at each side of the center area around the hole 11 and bent upwardly so that with the strips 13/14 each shaped into semi-cylindrical form, an upstanding tubular socket will be provided with the edges of the two semi-cylindrical sections disposed in abutting relation.

The finished form of the socket structure is revealed most clearly in FIGS. 2 through 5 where it will be seen that the base of the socket, or track plate 16, is flanged slightly inwardly around the center hole 11 to avoid a raw edge and to provide a lead-in area to the opening to the socket formed by the hole 11. As best shown in FIG. 3, the reflanged fold back 18 is disposed at the top side of the track plate 16 and the semi-cylindrical section 19 at each side is integral with the reflange and extends upwardly therefrom in juxtaposition with the opposite companion section, with the edges in abutting relationship to form the tubular socket.

The upper end portions 14 of the semi-cylindrical sections 19 are provided with coped out portions 20, on their respective inner edges, which enables the top end portion of the socket structure to be tapered inwardly. As best shown in FIG. 2, the tips of the inwardly sloping edges of the opposed upper end portions of the semi-cylindrical sections are overlapped, as at 21. These overlapped tip portions 21 serve to maintain the alignment of the opposed sections 19 and are readily displaced outwardly upon the insertion of a caster stem 23, as indicated in FIG. 3 and after the insertion of the stem, the tapered end portions spring back to engage under the end collar, or shoulder 22, on the stem, to hold the caster in place. A space 29 in the hole 26 of the mounting structure will accommodate the collar 22 on the stem above the top of the socket forming sections 19.

Thus, the overlapping tips 21 maintain the symmetry of the edge-to-edge relationship of the semi-cylindrical sections 19, to hold the sections in alignment and thereby form and hold the tubular section of the socket structure with the diametrically opposite joints, or seams 24, between the opposing sections, held in proper relationship and whereby the respective sections are maintained equally about the axis of the socket. The overlapping tips 21 also act to guide the cooperating semi-cylindrical sections 19 during any opening movements thereof, as when a caster stem 23 is inserted.

Each of the semi-cylindrical socket sections 19 has an outstanding spur like projection 25 extending outwardly and downwardly at an angle such as to engage in the surrounding wall of the hole 26 in which it is mounted, thus to increase the retention properties of the socket structure in the mounting hole. The angle of the spurs 25 is such that the socket structure can be driven into the hole 26 and will engage into the walls of the hole so that any movement of the socket in an outward direction will be met by the spurs digging into the wood walls of the hole 26 to securely retain the socket in the mounting hole. The projections, or spurs 25, are shown as having a squared straight edge where it enters the wood of the surrounding wall of the opening 26, but this edge might be constructed or disposed to present a point or a toothed edged, or a chisel edge for entry into the wood if desired. The spurs 25 are integral with the semi-cylindrical sections 19 and each is struck out of the wall of such section, as best indicated in FIG. 3.

In the typical caster socket installation illustrated in FIG. 7, test results, based upon tests conducted in hard wood, reveal that the socket retention value is about 40 pounds but the outstanding spurs 25 on the socket walls, as shown in FIG. 3 afford a retention value of 246 pounds, so that if this feature were used with the prior socket arrangement the increased retentive factor would total 286 pounds.

However, this socket structure affords a further substantial increase in the retentive factor of the socket structure mounting by the addition of improved upstanding teeth on the base track plate 16, which spread out as the socket is driven into the hole 26 of the mounting structure, as illustrated in FIG. 5. The upstanding teeth 27 are disposed at the perimeter of the track plate 16 on the two sides thereof at 90° to the disposition of the spurs 25. The teeth 27 normally stand vertically for being driven into the wood of the mounting structure and for readily entering into the wood are pointed at their upper edge, as shown in FIG. 1.

The important feature of each of these teeth 27 is the provision of a wedge surface 28, see FIG. 5, adjacent the upper end of each tooth and it is more important to note that this wedge like surface is located on the inner face of each tooth. Thus, when the socket is driven into the wooden mounting structure the teeth are caused to be deflected, or flared outwardly to spread the area of engagement thereof around the mounting hole 26 and thus secure a substantially increased area of purchase in the wood. It will be seen that as the teeth 27 are driven into the wood surrounding the hole 26, the teeth will be caused to assume a direction outwardly because of the sloping wedge surface 28 on the inside faces of the teeth and when fully driven into the mounting hole will be fully extended laterally as shown in FIG. 5.

Thus, the maximum retention value thereof is obtained because of this maximum spread of the teeth digging into the wood of the mounting structure. This adds a retentive factor of 102 pounds for the wedge shaped teeth and if they are used in combination with the outstanding spurs 25 on the socket the total retentive factor vecomes 348 pounds, as distinguished from the mere 40 pounds of the typical socket mounting shown in FIG. 7. Either of these features would improve the value of the typical installation.

The present teeth 27 are of greater height initially than the typical teeth of FIG. 7 and consequently will be driven deeper into the wood and with the spreading factor of the teeth will obtain a wider base of securement in the mounting. The very fact that the socket structure is of one piece construction enables it to be driven more readily and to a deeper extent than the typical arrangement, inasmuch as the collar around the base of the socket at the track plate is not present to act as a limiting element to the penetration of the socket into the mounting hole 26. The upper wedge shaped edges of the teeth are disclosed as being pointed, but it will be understood that the pointed construction is not a positive requirement of the spreading feature of the teeth provided by the wedge shaped edge, since the points might be eliminated while retaining the wedge shape and still obtain the spreading feature. In other words, the wedge shape might be utilized alone but the combination of the points with the wedge contours is preferred inasmuch as the combination affords easier starting of the teeth into the wood and actually facilitates the deflection, or spreading of the teeth outwardly as the driving operation is continued.

The typical caster socket installation as practiced previous to this invention is shown in FIG. 7 and by comparison of the structure of this arrangement with the present improvements, as best revealed in FIGS. 3 and 5, the advances in this art afforded by the present socket structure can readily be appreciated. In FIG. 7, it will be seen that the two piece construction, which is used in the prior art to the extent of being practically universal, results in a distinct ridge, or collar 30, which is created by forming an interlocking joint between the track plate 31 and the related upstanding tubular socket 32.

The socket 32 extends downwardly through the track plate and is flanged under the plate, as at 33. The track plate has an upstanding inner flange 34 surrounding the socket 32 and when the base portion of the socket and the surrounding flange 34 are simultaneously upset to form the interengaged relationship of the two parts, thus securing the socket 32 in respect to the upstanding flange on the track plate 31 and fixing the two parts together, the collar 30 results. It will be seen that the upstanding teeth 35 on the perimeter of the track plate are only slightly greater in height than the collar 30, so that the teeth can only penetrate the wood of the mounting structure to the extent permitted by the depth of the collar, since, when the collar 30 engages the underside of the mounting structure it acts as a stop to limit further driving action and thereby prevent further penetration of the teeth 35 into the wood.

The structure of the present socket arrangement being integral, does not have an obstruction around the base of the tubular socket and therefore can be driven into a hole 26 of a wooden mounting until the upper surface of the track plate, as represented by the folded back portion 18, is brought into contact with the underside of the wooden mounting, at which time the teeth 27 will have attained full penetration and spread out to their maximum extent. A caster stem 23 can then be inserted into the socket to the point where the shoulder 22 on the stem engages over the top end portions 14 of the socket members 19 and thereby secure the caster in the mounting.

From the foregoing it will be seen that this invention has provided a caster mounting socket of unique concept wherein the design of the socket has been greatly improved and incorporating features not found in any previous caster socket mounting structure including wedge shaped upstanding teeth which spread laterally in the mounting structure and projections on the socket which engage into the mounting structure and one, or both, greatly increasing the retention properties of the socket in the mounting.

What is claimed is:

1. A caster mounting socket comprised of a base plate and an upstanding socket, a plurality of upstanding teeth arranged on a radius around said base plate and disposed concentrically about the perimeter thereof, said teeth each having a generally vertical outer surface and an inner surface extending vertically for at least part of the height of the teeth, and a sloping wedge shaped face on said inner surface immediately above said vertical part of the inner surface adjacent the upper edge of each of said teeth, said wedge shaped face being disposed at an upwardly and outwardly extending angle from said inner vertical surface of the respective teeth to provide teeth disposed concentrically around said perimeter each of which tapers upwardly and outwardly above said vertical inner surface as defined by said wedge shaped face.

2. A caster mounting socket as set forth in claim 1 wherein said teeth are each formed with an upwardly disposed point and disposed in parallel relation to the vertical axis of said socket at diametrically opposite sides of the socket.

3. A caster mounting socket as set forth in claim 2 wherein said socket comprises a pair of semi-cylindrical sections in edge-to-edge abutting relationship defining a pair of vertical seams at diametrically opposite sides of the socket, said semi-cylindrical sections being formed integrally with a reflanged fold back portion of said base plate and extending upwardly from said fold back portion, and a central opening in the base plate for passage of a caster stem into said socket.

4. A caster mounting socket as set forth in claim 3 wherein said semi-cylindrical sections have inwardly tapering upper portions disposed in overlapping relationship adjacent their upper tips whereby the sections are maintained in edge-to-edge alignment.

5. A caster mounting socket as set forth in claim 4 wherein said semi-cylindrical sections are each coped out at their edges in the area of said tapering upper portion and an outwardly and downwardly extending projection is struck out of the wall of each of said sections.

6. A caster mounting socket as set forth in claim 3 wherein said fold back portions are integral with said base plate and said upstanding teeth are integral with the base plate and extend upwardly at opposite sides of the reflanged fold back portions.

* * * * *